United States Patent
Arakida

(10) Patent No.: US 12,506,325 B2
(45) Date of Patent: Dec. 23, 2025

(54) LIGHT EMITTING DEVICE AND METHOD OF MANUFACTURING LIGHT EMITTING DEVICE

(71) Applicant: Sony Semiconductor Solutions Corporation, Kanagawa (JP)

(72) Inventor: Takahiro Arakida, Kumamoto (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 890 days.

(21) Appl. No.: 17/777,874

(22) PCT Filed: Dec. 9, 2020

(86) PCT No.: PCT/JP2020/045814
§ 371 (c)(1),
(2) Date: May 18, 2022

(87) PCT Pub. No.: WO2021/125005
PCT Pub. Date: Jun. 24, 2021

(65) Prior Publication Data
US 2022/0416510 A1  Dec. 29, 2022

(30) Foreign Application Priority Data
Dec. 20, 2019 (JP) .................................. 2019-230069

(51) Int. Cl.
*H01S 5/22* (2006.01)
(52) U.S. Cl.
CPC .................................. *H01S 5/2224* (2013.01)
(58) Field of Classification Search
CPC .. H01S 5/2224; H01S 5/0216; H01S 5/04253; H01S 5/0217; H01S 5/02335;
(Continued)

(56) References Cited

U.S. PATENT DOCUMENTS

| 5,459,081 A | 10/1995 | Kajita | |
|---|---|---|---|
| 2003/0194168 A1* | 10/2003 | Ouchi | G11B 7/123 |

(Continued)

FOREIGN PATENT DOCUMENTS

| JP | H05211346 A | 8/1993 |
|---|---|---|
| JP | H07-202162 A | 8/1995 |

(Continued)

OTHER PUBLICATIONS

International Search Report issued in International Patent Application No. PCT/JP2020/045814 on Mar. 2, 2021 and English translation of same. 5 pages.

(Continued)

*Primary Examiner* — Robert G Bachner
(74) *Attorney, Agent, or Firm* — K&L Gates LLP

(57) ABSTRACT

A light emitting device according to an embodiment of the present disclosure includes: a semi-insulating substrate having a first surface and a second surface that are opposed to each other; a first semiconductor layer that is stacked on the first surface of the semi-insulating substrate and has a lattice plane non-continuous to the semi-insulating substrate; and a semiconductor stacked body that is stacked above the first surface of the semi-insulating substrate with the semiconductor layer interposed in between. The first semiconductor layer has a first electrical conduction type. The semiconductor stacked body has a light emitting region configured to emit laser light.

18 Claims, 14 Drawing Sheets

(58) Field of Classification Search
CPC .. H01S 5/34313; H01S 5/0208; H01S 5/0234; H01S 5/04257; H01S 5/18311; H01S 5/18347; H01S 5/18305; H01S 5/423; H01S 2301/173; G01S 17/894
See application file for complete search history.

(56) References Cited

U.S. PATENT DOCUMENTS

| | | |
|---|---|---|
| 2006/0227835 A1 | 10/2006 | Ueki |
| 2007/0090399 A1* | 4/2007 | Chin ................. H10D 30/4738 |
| | | 257/E29.189 |
| 2009/0098675 A1* | 4/2009 | Masui ................. H01S 5/18311 |
| | | 438/39 |
| 2013/0016752 A1 | 1/2013 | Lell et al. |
| 2018/0180829 A1 | 6/2018 | Gudeman |
| 2019/0305518 A1 | 10/2019 | Olivier |
| 2019/0363520 A1 | 11/2019 | Laflaquiere |

FOREIGN PATENT DOCUMENTS

| | | |
|---|---|---|
| JP | H08-340146 A | 12/1996 |
| JP | 2001-068795 A | 3/2001 |
| JP | 2008524870 A | 7/2008 |
| JP | 2012023326 A | 2/2012 |

OTHER PUBLICATIONS

Written Opinion issued in International Patent Application No. PCT/JP2020/045814 on Mar. 2, 2021. 4 pages.

\* cited by examiner

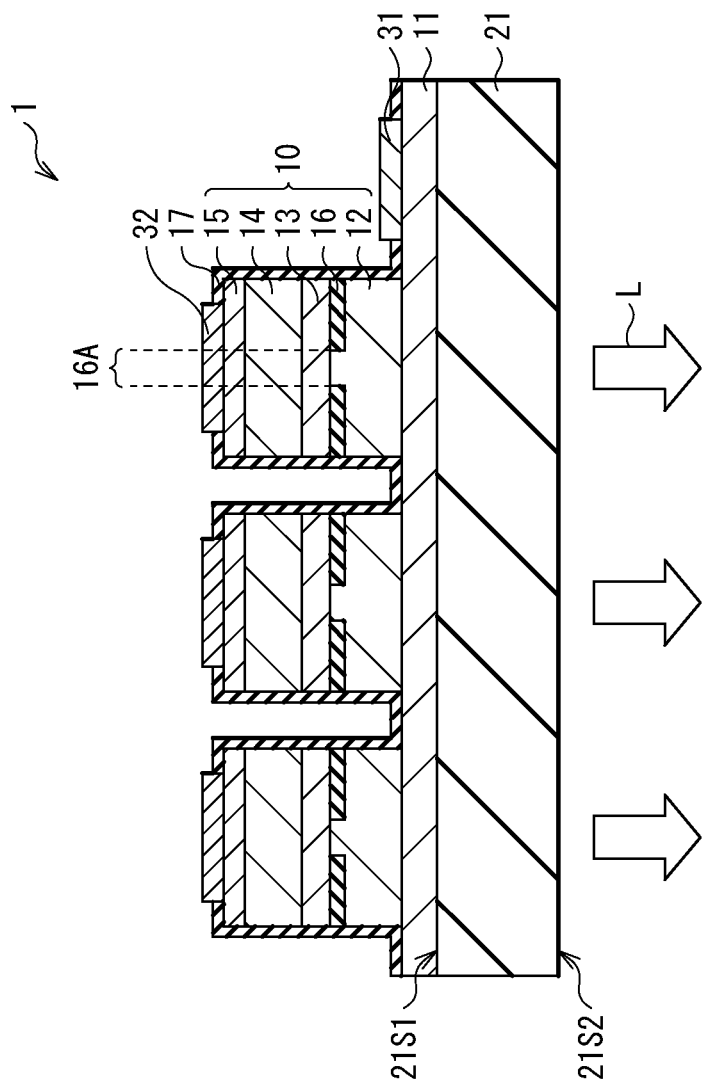
[ FIG. 1 ]

[ FIG. 2A ]
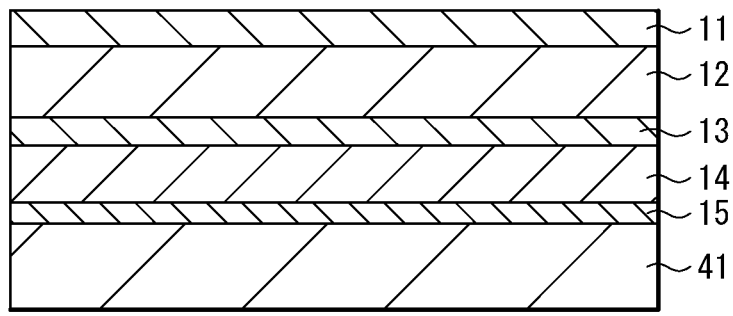
[ FIG. 2B ]
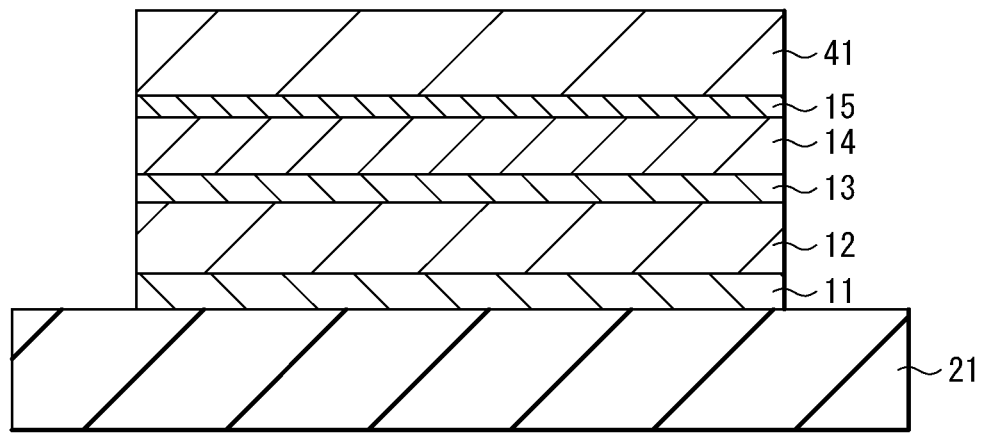
[ FIG. 2C ]
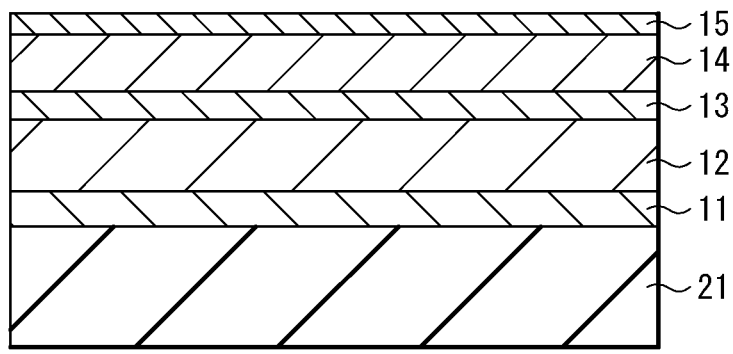

[ FIG. 2D ]
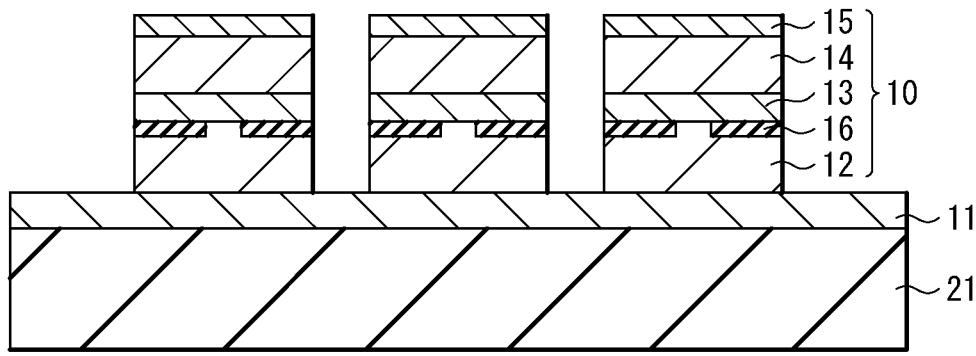
[ FIG. 2E ]
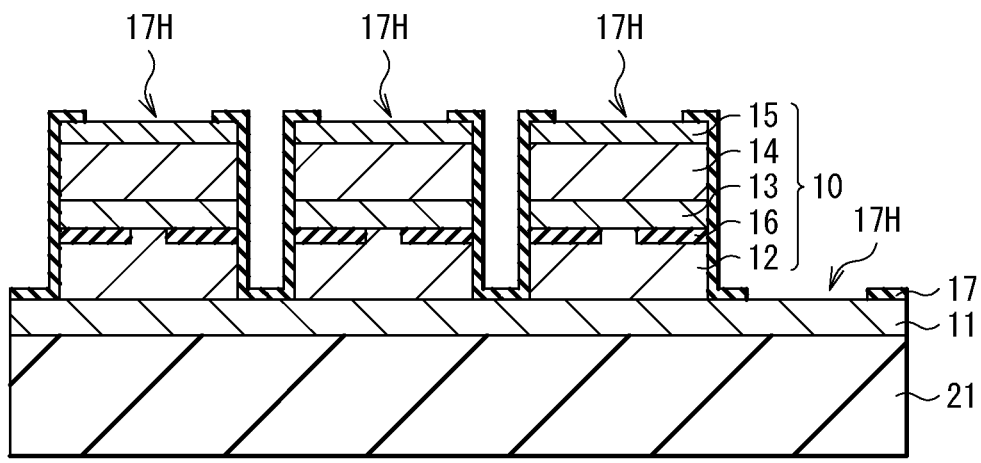
[ FIG. 2F ]
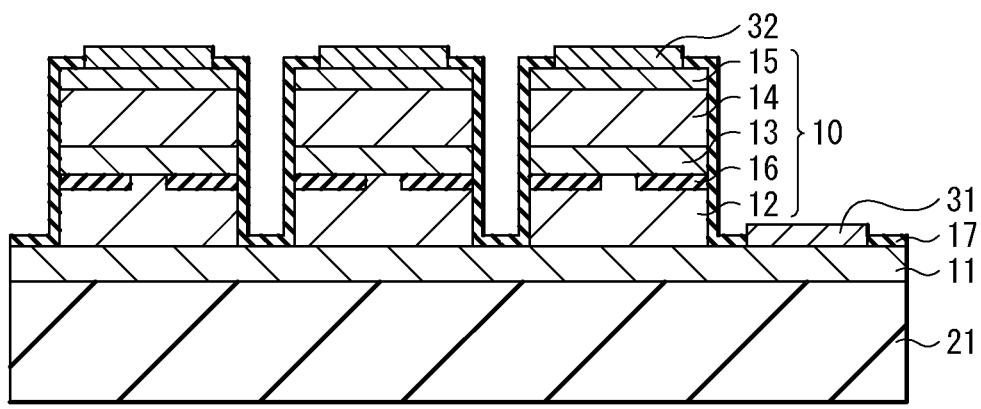

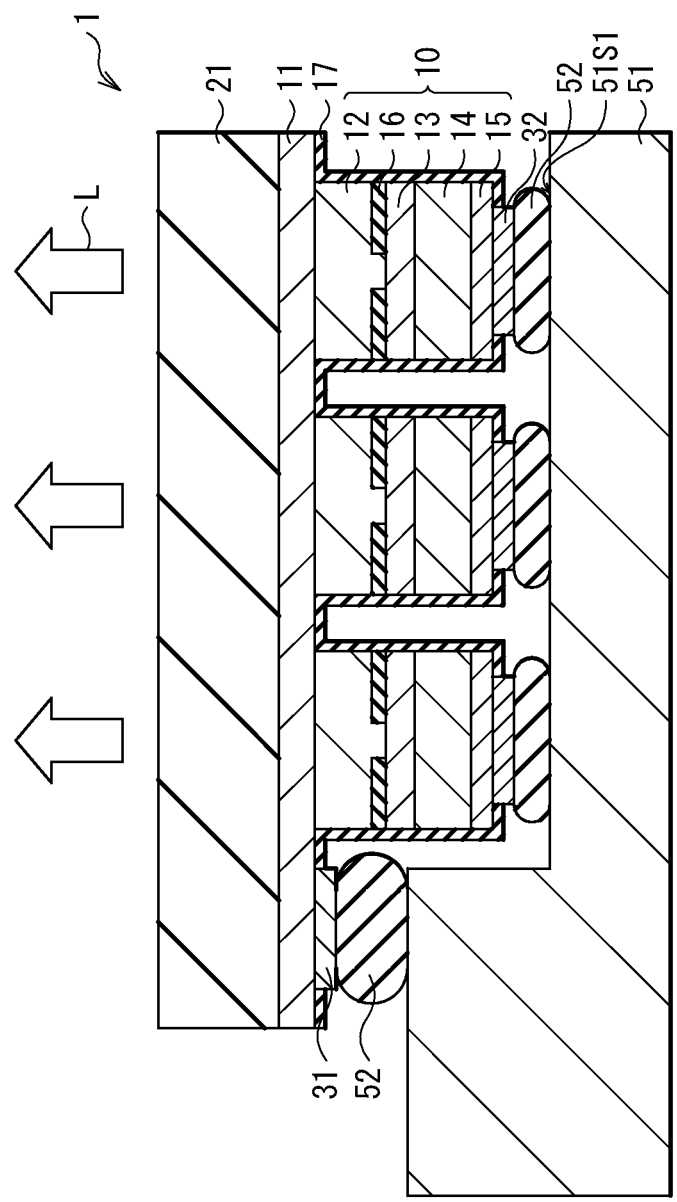
[ FIG. 3 ]

[ FIG. 4 ]
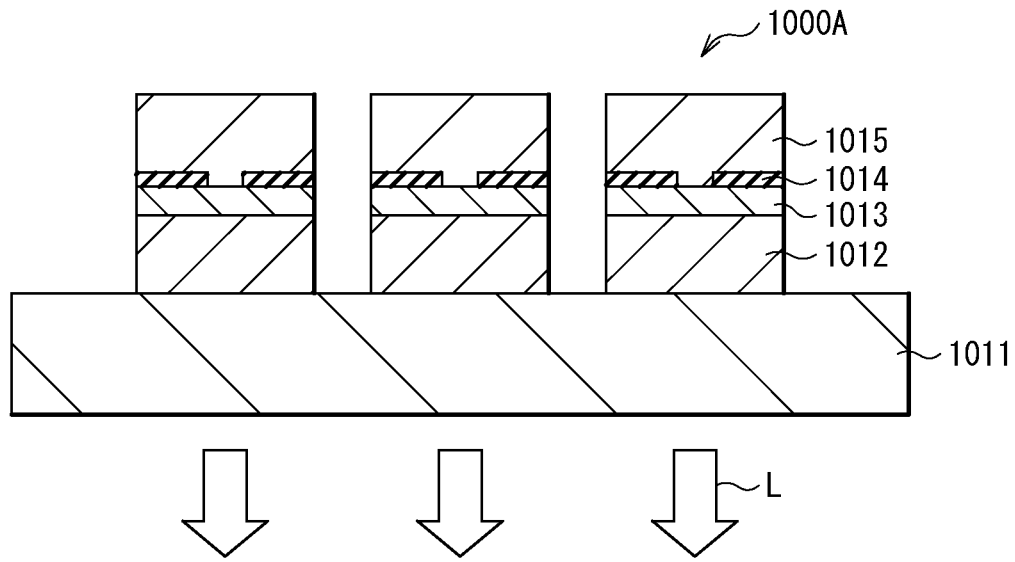
[ FIG. 5 ]
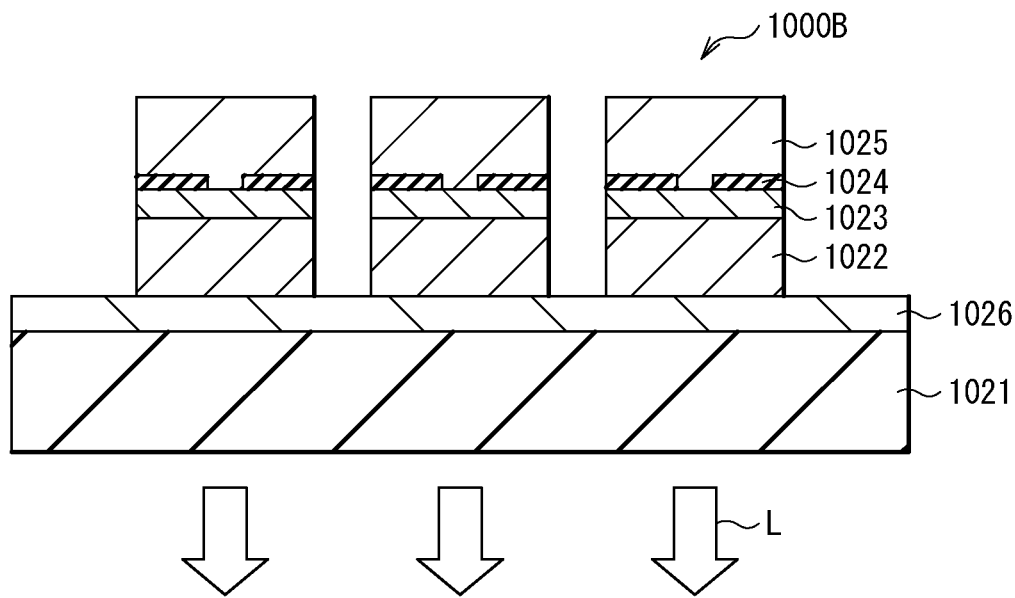

[ FIG. 6A ]
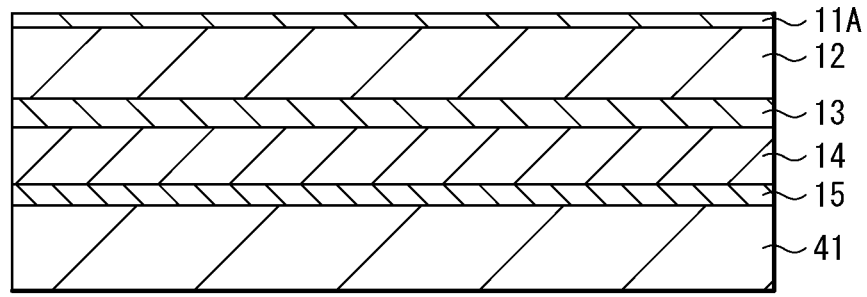
[ FIG. 6B ]
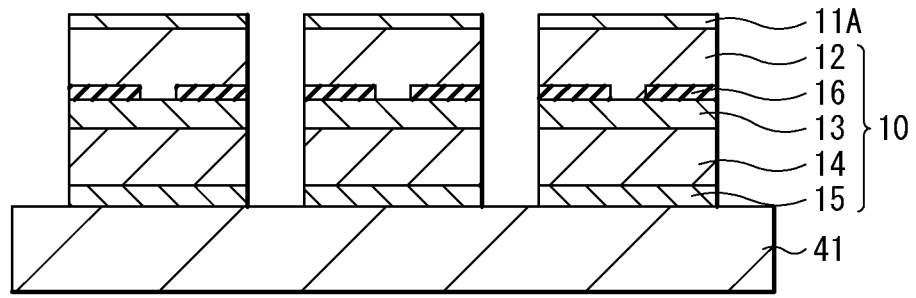
[ FIG. 6C ]
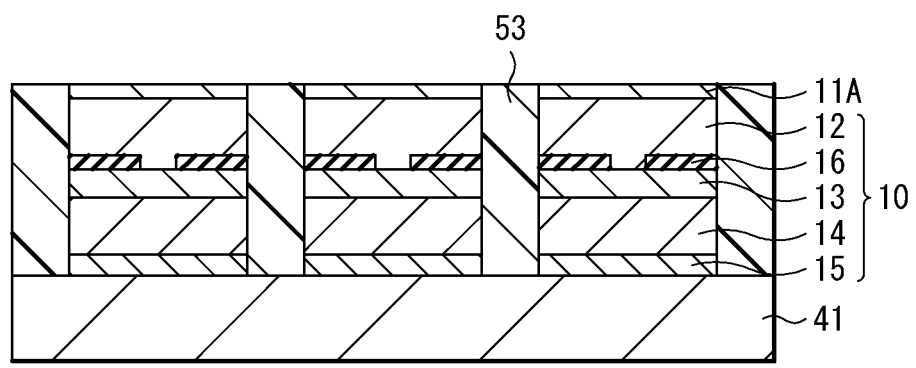
[ FIG. 6D ]
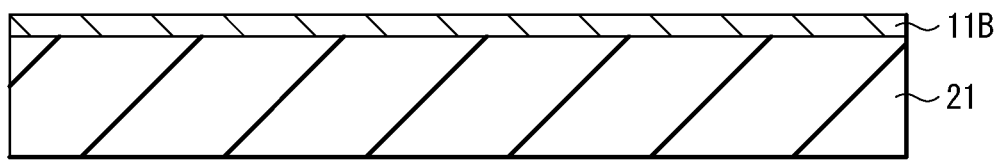

[ FIG. 6E ]
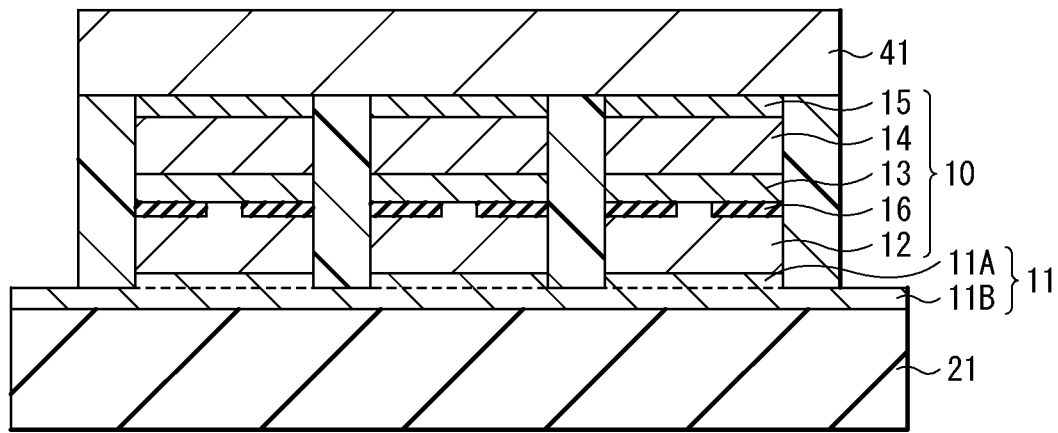
[ FIG. 6F ]
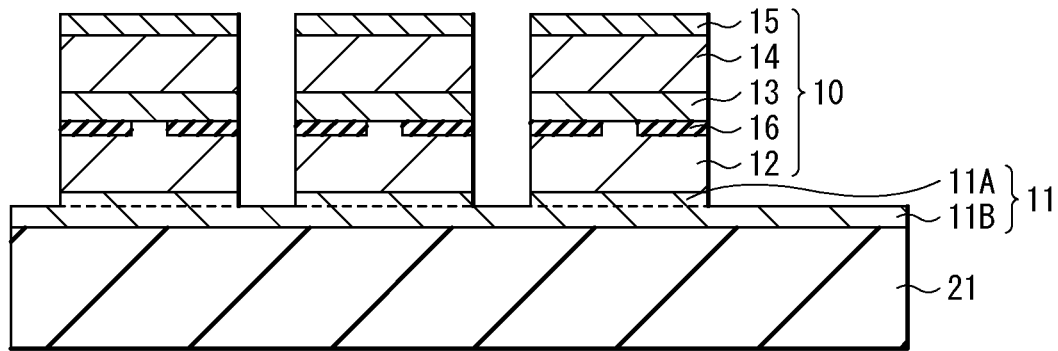
[ FIG. 6G ]
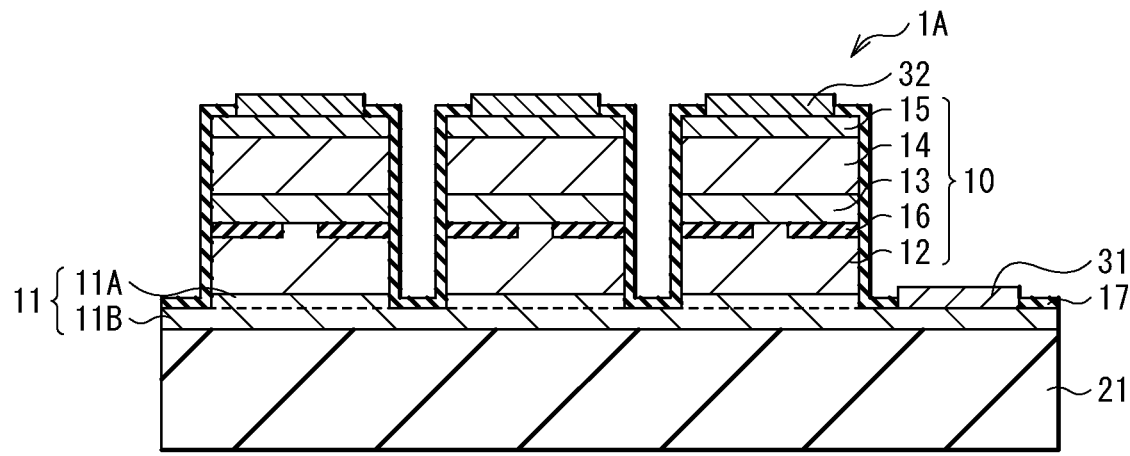

[ FIG. 7A ]
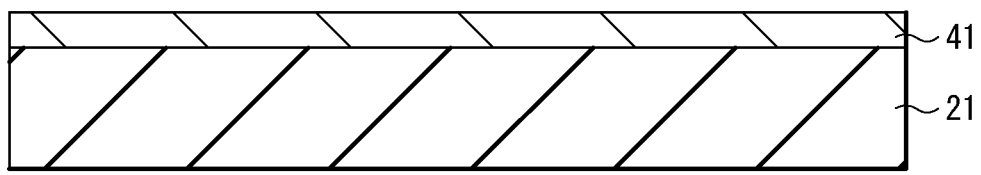
[ FIG. 7B ]
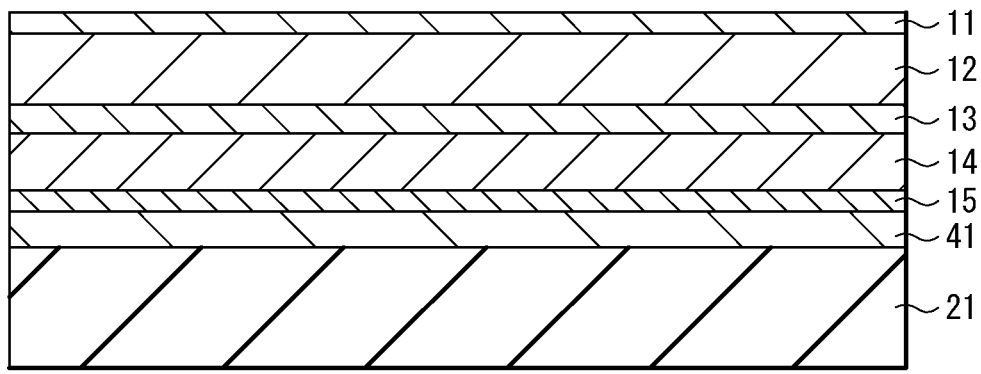
[ FIG. 7C ]
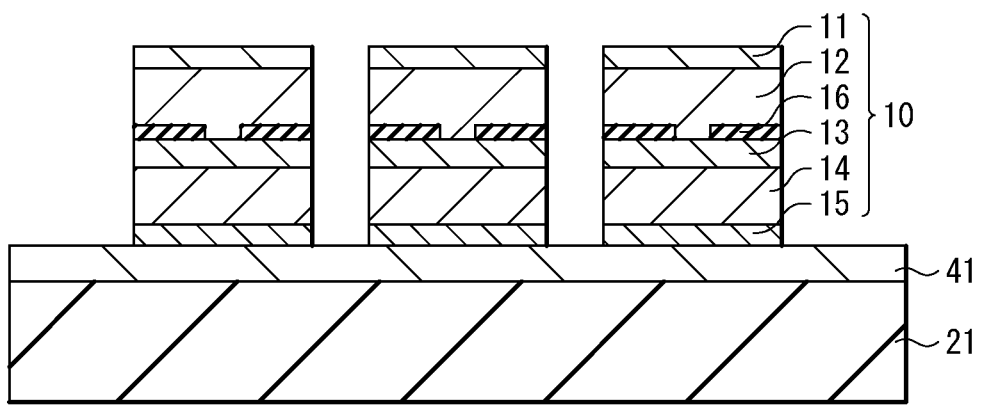

[ FIG. 7D ]
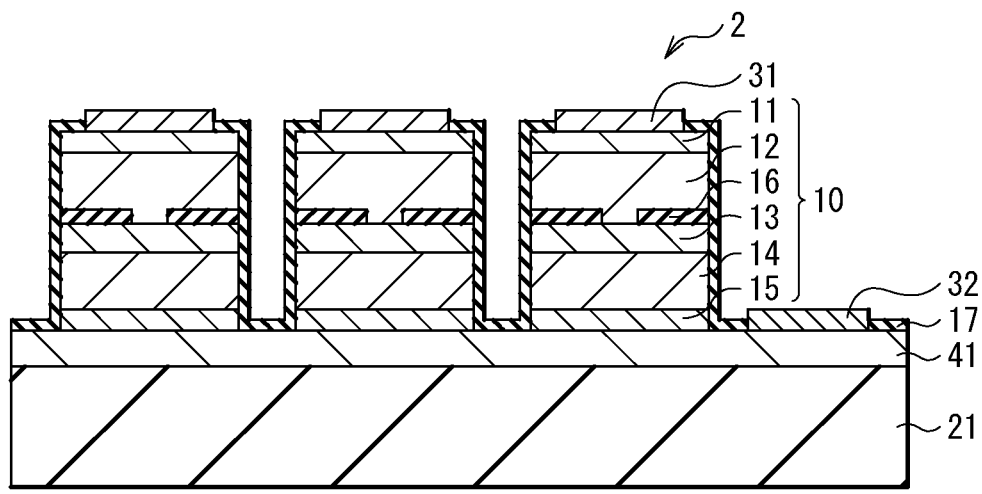

[ FIG. 8A ]
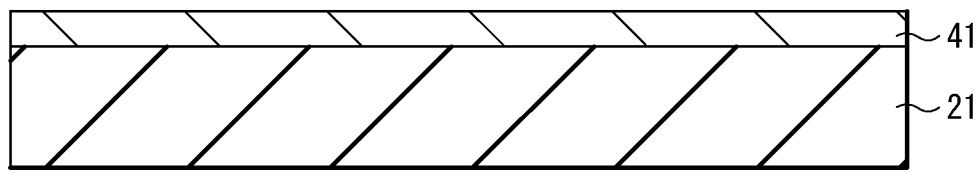
[ FIG. 8B ]
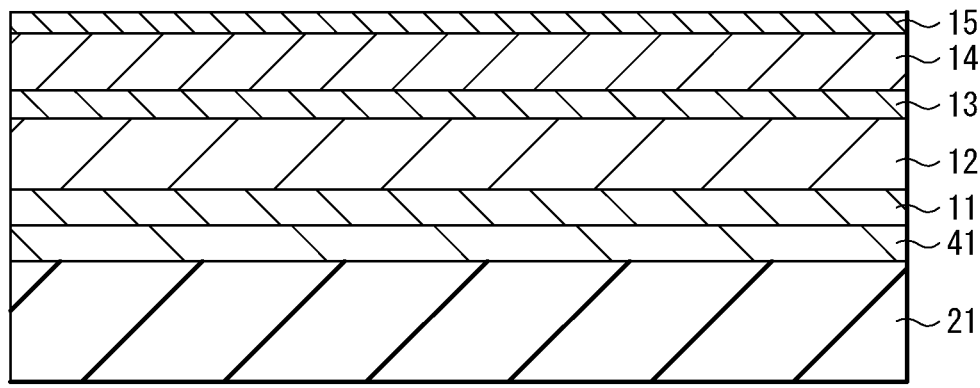
[ FIG. 8C ]
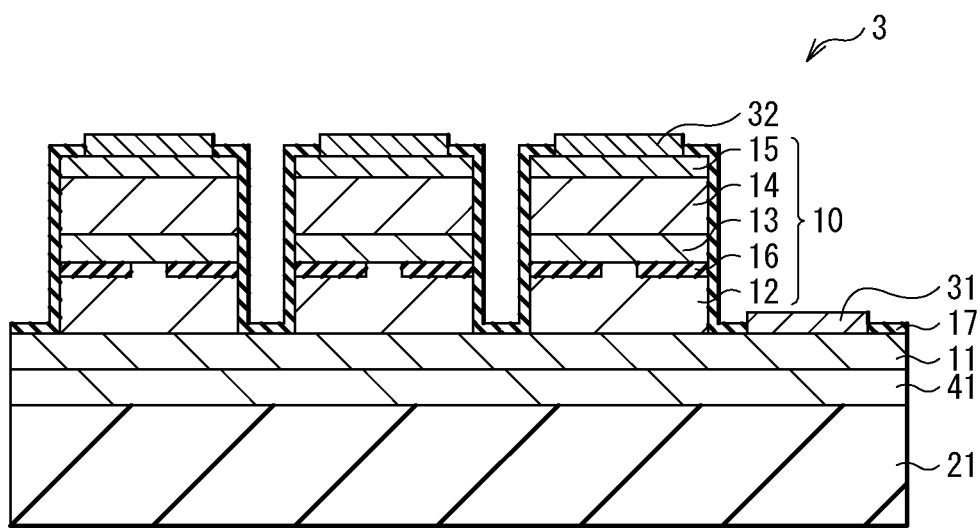

[ FIG. 9 ]
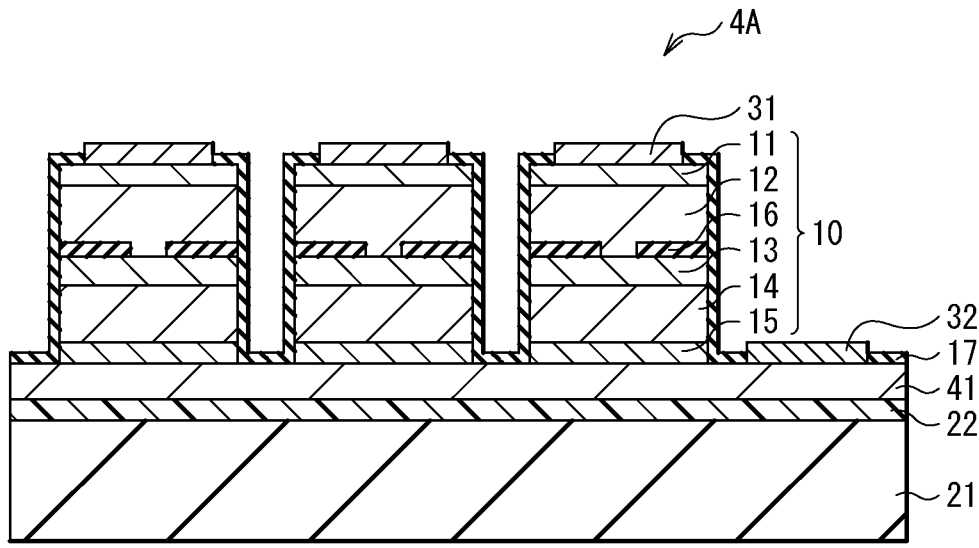
[ FIG. 10 ]
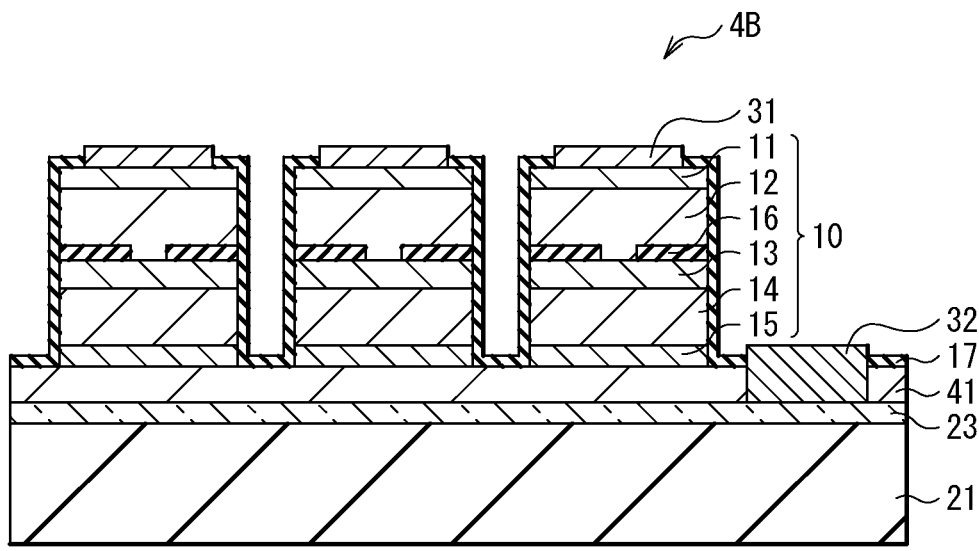

[ FIG. 11 ]
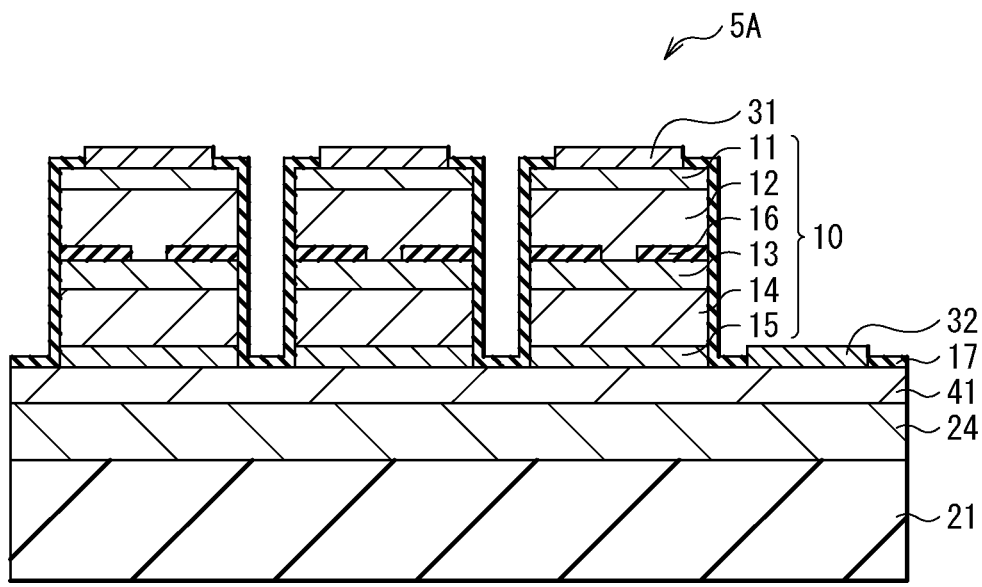
[ FIG. 12 ]
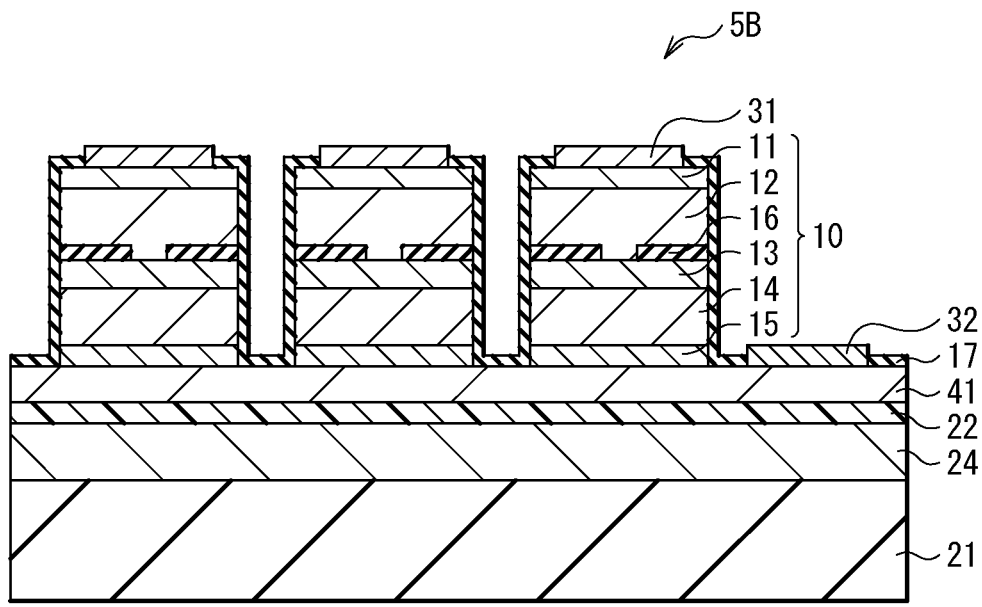

[ FIG. 13 ]
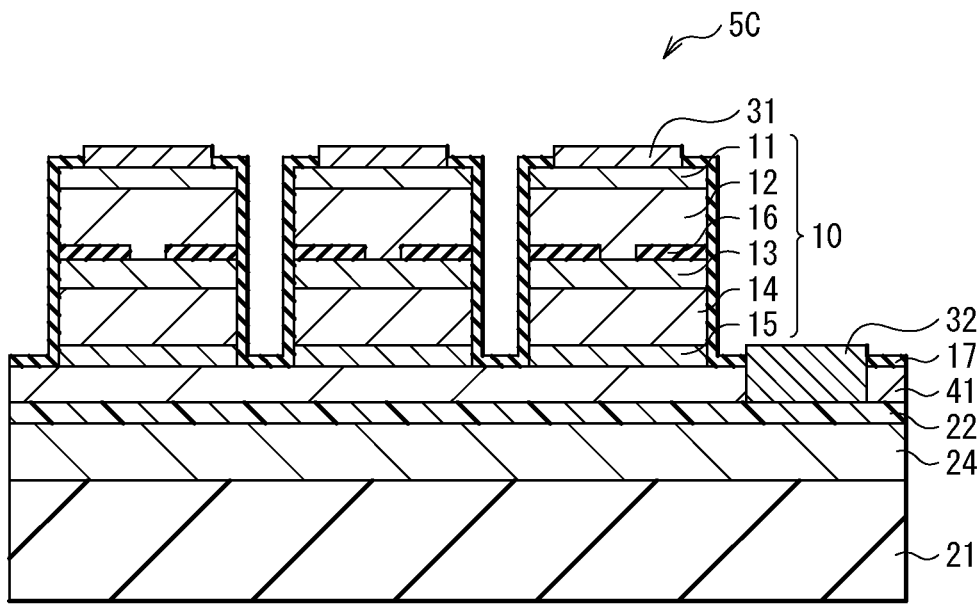
[ FIG. 14 ]
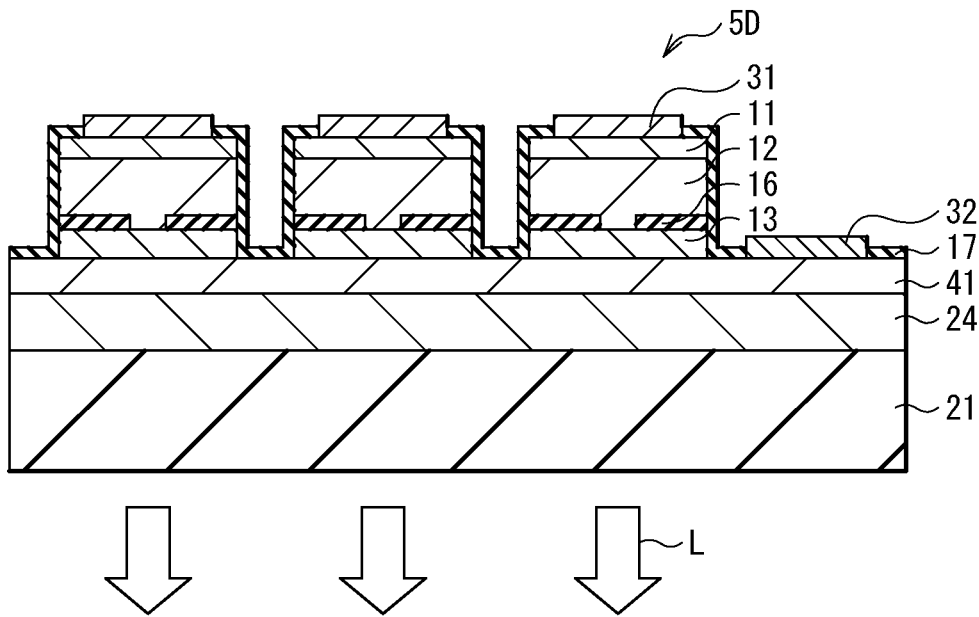

[ FIG. 15 ]
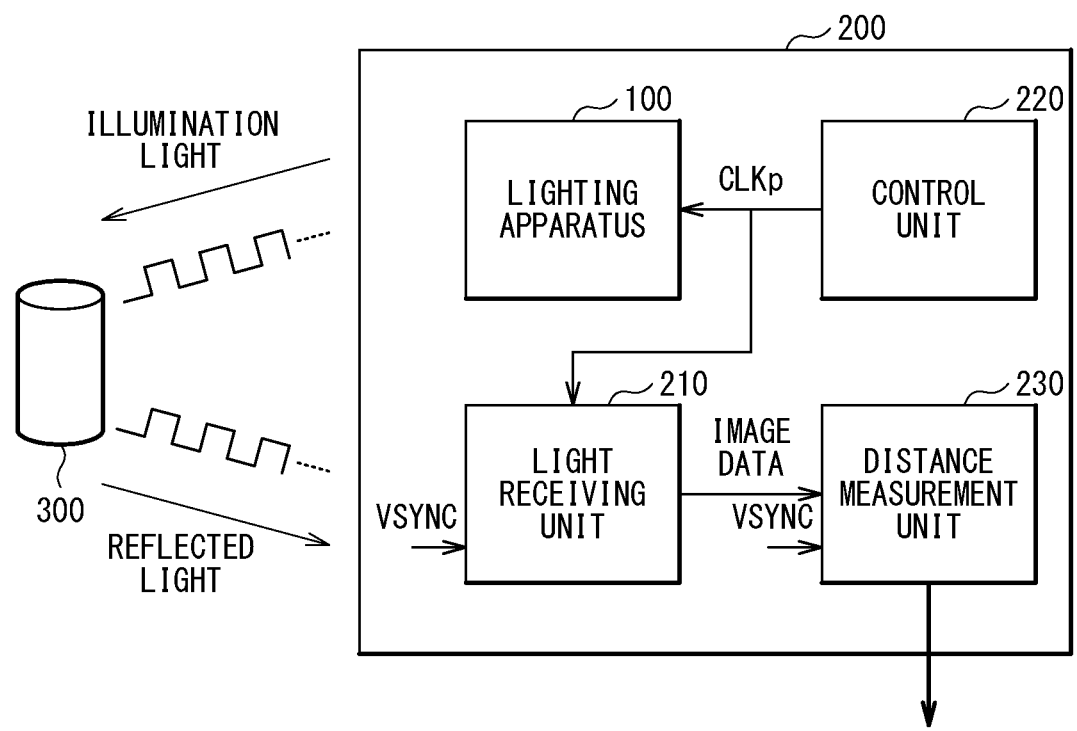

LIGHT EMITTING DEVICE AND METHOD OF MANUFACTURING LIGHT EMITTING DEVICE

TECHNICAL FIELD

The present disclosure relates, for example, to a back-emitting light emitting device and a method of manufacturing a light emitting device.

BACKGROUND ART

For example, PTL 1 discloses a surface-type light emitting element in which an n-type semiconductor multilayered film, a substrate-side contact and injection layer and a p-type semiconductor multilayered film, a cavity including a light emitting layer, and an n-type semiconductor multilayered film are formed on an n-type or semi-insulating GaAs substrate in this order. The n-type semiconductor multilayered film is included in a substrate-side mirror. The n-type semiconductor multilayered film is included in an air-side mirror.

CITATION LIST

Patent Literature

PTL 1: Japanese Unexamined Patent Application Publication No. H5-211346

SUMMARY OF THE INVENTION

Incidentally, a so-called back-emitting light emitting device is requested to have higher laser oscillation characteristics and higher reliability.

It is desirable to provide a light emitting device having favorable laser oscillation characteristics and high reliability and a method of manufacturing a light emitting device.

A light emitting device according to an embodiment of the present disclosure includes: a semi-insulating substrate having a first surface and a second surface that are opposed to each other; a first semiconductor layer that is stacked on the first surface of the semi-insulating substrate and has a lattice plane non-continuous to the semi-insulating substrate; and a semiconductor stacked body that is stacked above the first surface of the semi-insulating substrate with the semiconductor layer interposed in between. The first semiconductor layer has a first electrical conduction type. The semiconductor stacked body has a light emitting region configured to emit laser light.

A method of manufacturing a light emitting device according to an embodiment of the present disclosure includes bonding a semi-insulating substrate and a semiconductor stacked body with a first semiconductor layer interposed in between. The semi-insulating substrate has a first surface and a second surface that are opposed to each other. The semiconductor stacked body has a light emitting region configured to emit laser light. The first semiconductor layer has a first electrical conduction type.

In the light emitting device and the method of manufacturing the light emitting device according to the respective embodiments of the present disclosure, the semiconductor stacked body is grown on the other substrate and the semiconductor stacked body is then joined to the semi-insulating substrate with the first semiconductor layer interposed in between. The semiconductor stacked body includes the first semiconductor layer having the first electrical conduction type and the light emitting region configured to emit the laser light. This causes the substrate to absorb less laser light and forms a semiconductor stacked body having a lower crystal defect density.

BRIEF DESCRIPTION OF DRAWING

FIG. 1 is a cross-sectional schematic diagram illustrating an example of a configuration of a semiconductor laser according to an embodiment of the present disclosure.

FIG. 2A is a cross-sectional schematic diagram describing an example of a method of manufacturing the semiconductor laser illustrated in FIG. 1.

FIG. 2B is a cross-sectional schematic diagram illustrating a step subsequent to FIG. 2A.

FIG. 2C is a cross-sectional schematic diagram illustrating a step subsequent to FIG. 2B.

FIG. 2D is a cross-sectional schematic diagram illustrating a step subsequent to FIG. 2C.

FIG. 2E is a cross-sectional schematic diagram illustrating a step subsequent to FIG. 2D.

FIG. 2F is a cross-sectional schematic diagram illustrating a step subsequent to FIG. 2E.

FIG. 3 is a cross-sectional schematic diagram illustrating an example of a configuration of a light emitting apparatus in which the semiconductor laser illustrated in FIG. 1 is mounted on a mounting substrate.

FIG. 4 is a cross-sectional schematic diagram describing an example of a typical semiconductor laser.

FIG. 5 is a cross-sectional schematic diagram describing another example of the typical semiconductor laser.

FIG. 6A is a cross-sectional schematic diagram describing a method of manufacturing a semiconductor laser according to a modification example 1 of the present disclosure.

FIG. 6B is a cross-sectional schematic diagram illustrating a step subsequent to FIG. 6A.

FIG. 6C is a cross-sectional schematic diagram illustrating a step subsequent to FIG. 6B.

FIG. 6D is a cross-sectional schematic diagram illustrating a step subsequent to FIG. 6C.

FIG. 6E is a cross-sectional schematic diagram illustrating a step subsequent to FIG. 6D.

FIG. 6F is a cross-sectional schematic diagram illustrating a step subsequent to FIG. 6E.

FIG. 6G is a cross-sectional schematic diagram illustrating a step subsequent to FIG. 6F.

FIG. 7A is a cross-sectional schematic diagram describing a method of manufacturing a semiconductor laser according to a modification example 2 of the present disclosure.

FIG. 7B is a cross-sectional schematic diagram illustrating a step subsequent to FIG. 7A.

FIG. 7C is a cross-sectional schematic diagram illustrating a step subsequent to FIG. 7B.

FIG. 7D is a cross-sectional schematic diagram illustrating a step subsequent to FIG. 7C.

FIG. 8A is a cross-sectional schematic diagram describing a method of manufacturing a semiconductor laser according to a modification example 3 of the present disclosure.

FIG. 8B is a cross-sectional schematic diagram illustrating a step subsequent to FIG. 8A.

FIG. 8C is a cross-sectional schematic diagram illustrating a step subsequent to FIG. 8B.

FIG. 9 is a cross-sectional schematic diagram illustrating an example of a configuration of a semiconductor laser according to a modification example 4 of the present disclosure.

FIG. 10 is a cross-sectional schematic diagram illustrating another example of the configuration of the semiconductor laser according to the modification example 4 of the present disclosure.

FIG. 11 is a cross-sectional schematic diagram illustrating an example of a configuration of a semiconductor laser according to a modification example 5 of the present disclosure.

FIG. 12 is a cross-sectional schematic diagram illustrating another example of the configuration of the semiconductor laser according to the modification example 5 of the present disclosure.

FIG. 13 is a cross-sectional schematic diagram illustrating another example of the configuration of the semiconductor laser according to the modification example 5 of the present disclosure.

FIG. 14 is a cross-sectional schematic diagram illustrating another example of the configuration of the semiconductor laser according to the modification example 5 of the present disclosure.

FIG. 15 is a block diagram illustrating an example of a schematic configuration of a distance measurement system including the light emitting apparatus illustrated in FIG. 3.

MODES FOR CARRYING OUT THE INVENTION

The following describes an embodiment of the present disclosure in detail with reference to the drawings. The following description is a specific example of the present disclosure, but the present disclosure is not limited to the following modes. In addition, the present disclosure is not limited to the disposition, dimensions, dimensional ratios, or the like of the respective components illustrated in the drawings. It is to be noted that description is given in the following order.

1. Embodiment (an example of a semiconductor laser having, onto a semi-insulating substrate, a semiconductor stacked body joined that has been epitaxially grown on another substrate)
1-1. Configuration of Semiconductor Laser
1-2. Method of Manufacturing Semiconductor Laser
1-3. Workings and Effects
2. Modification Examples
2-1. Modification Example 1 (an example of a method of manufacturing a semiconductor laser)
2-2. Modification Example 2 (an example of a method of manufacturing a semiconductor laser)
2-3. Modification Example 3 (an example of a method of manufacturing a semiconductor laser)
2-4. Modification Example 4 (another configuration example of a semiconductor laser)
2-5. Modification Example 5 (another configuration example of a semiconductor laser)
3. Application Example (an example of a distance measurement system)

1. Embodiment

FIG. 1 schematically illustrates an example of a cross-sectional configuration of a light emitting device (semiconductor laser 1) according to an embodiment of the present disclosure. This semiconductor laser 1 is, for example, back-emitting VCSEL (Vertical Cavity Surface Emitting LASER). For example, a plurality of VCSELs is integrated in an array as a plurality of light emitting regions.

(1-1. Configuration of Semiconductor Laser)

The semiconductor laser 1 includes, for example, a plurality of semiconductor stacked bodies 10 on a first surface (front surface (surface 21S1)) of a semi-insulating substrate 21. Each of the semiconductor stacked bodies 10 has, for example, a columnar shape (mesa shape). For example, a first light reflecting layer 12, an active layer 13, a second light reflecting layer 14, and a second contact layer 15 are stacked in this order. There is provided a current confining layer 16 between the first light reflecting layer 12 and the active layer 13. The current confining layer 16 has a current injection region 16A formed therein. The semiconductor stacked body 10 is stacked above the front surface (surface 21S1) of the semi-insulating substrate 21 with a first contact layer 11 interposed in between. The semiconductor stacked body 10 has a non-continuous lattice plane between the front surface (surface 21S1) of the semi-insulating substrate 21 and the semiconductor stacked body 10. Specifically, the semiconductor stacked body 10 has a non-continuous lattice plane at the interface between the front surface (surface 21S1) of the semi-insulating substrate 21 and the first contact layer 11. This semiconductor stacked body 10 corresponds to a specific example of a "semiconductor stacked body" according to the present disclosure. There is provided a first electrode 31 on the first contact layer 11. The first electrode 31 is common to the respective semiconductor stacked bodies 10. There are provided second electrodes 32 on the upper surfaces (surfaces 10S1) of the respective semiconductor stacked bodies 10. The front surface (surface 11S1) of the first contact layer 11 and the upper surfaces (surfaces 10S1) and the side surfaces (surfaces 10S3) of the semiconductor stacked bodies 10 except for this first electrode 31 and these second electrodes 32 are covered with an insulating film 17.

The first contact layer 11 includes, for example, a GaAs-based semiconductor. The first contact layer 11 is for electrically coupling the first electrode 31 and the first light reflecting layer 12 of each of the semiconductor stacked bodies 10. The first contact layer 11 includes, for example, p-type GaAs. The first contact layer 11 corresponds to a specific example of a "first semiconductor layer" according to the present disclosure.

The first light reflecting layer 12 is disposed between the first contact layer 11 and the current confining layer 16. The first light reflecting layer 12 is opposed to the second light reflecting layer 14 with the active layer 13 and the current confining layer 16 interposed in between. The first light reflecting layer 12 resonates the light generated in the active layer 13 between the first light reflecting layer 12 and the second light reflecting layer 14. The first light reflecting layer 12 corresponds to a specific example of a "first light reflecting layer" according to the present disclosure.

The first light reflecting layer 12 is a DBR (Distributed Bragg Reflector) layer in which low refractive index layers (not illustrated) and high refractive index layers (not illustrated) are alternately stacked. Each of the low refractive index layers includes, for example, p-type $Al_{x1}Ga_{1-x1}As$ ($0<x1\leq1$) having an optical thickness of $\lambda \times \frac{1}{4}$ n and each of the high refractive index layers includes, for example, p-type $Al_{x2}Ga_{1-x2}As$ ($0\leq x2<x1$) having an optical thickness of $\lambda \times \frac{1}{4}$ n. $\lambda$ represents the oscillation wavelength of laser light emitted from each of the light emitting regions and n represents the refractive index.

The active layer 13 is provided between the first light reflecting layer 12 and the second light reflecting layer 14. The active layer 13 includes, for example, an aluminum-gallium-arsenide (AlGaAs)-based semiconductor material.

In the active layer 13, the holes and electrons injected from the first electrode 31 and the second electrode 32 undergo radiative recombination to generate stimulated emission light. The region of the active layer 13 opposed to the current injection region 16A serves as a light emitting region. For example, undoped $Al_{X3}Ga_{1-X3}As$ ($0<X3\leq0.45$) is usable for the active layer 13. The active layer 13 may have a multi quantum well (MQW: Multi Quantum Well) structure of GaAs and AlGaAs, for example. Additionally, the active layer 13 may have a multi quantum well structure of indium gallium arsenide (InGaAs) and AlGaAs. The active layer 13 corresponds to a specific example of an "active layer" according to the present disclosure.

The second light reflecting layer 14 is a DBR layer disposed between the active layer 13 and the second electrode 32. The second light reflecting layer 14 is opposed to the first light reflecting layer 12 with the active layer 13 and the current confining layer 16 interposed in between. The second light reflecting layer 14 corresponds to a specific example of a "second light reflecting layer" according to the present disclosure.

The second light reflecting layer 14 has a stacked structure in which low refractive index layers and high refractive index layers are alternately superimposed. A low refractive index layer is n-type $Al_{X4}Ga_{1-X4}As$ ($0<X4\leq1$) having, for example, an optical film thickness of $\lambda/4$ n. A high refractive index layer is n-type $Al_{X5}Ga_{1-X5}As$ ($0\leq X5<X4$) having, for example, an optical film thickness of $\lambda/4$ n.

The second contact layer 15 includes, for example, a GaAs-based semiconductor having electrical conductivity. The second contact layer 15 includes, for example, n-type GaAs.

The current confining layer 16 is provided between the first light reflecting layer 12 and the active layer 13. The current confining layer 16 is formed to have an annular shape having a predetermined width from the outer periphery side to the inner side of the semiconductor stacked body 10 having, for example, a mesa shape. In other words, the current confining layer 16 is provided between the first light reflecting layer 12 and the active layer 13. The current confining layer 16 has an opening having a predetermined width at the middle portion thereof. This opening serves as the current injection region 16A. The current confining layer 16 includes, for example, p-type AlGaAs. Specifically, the current confining layer 16 includes $Al_{0.85}Ga_{0.15}As$ to AlAs. This is oxidized as an aluminum oxide ($AlO_x$) layer to confine currents. Providing the semiconductor laser 1 with this current confining layer 16 confines currents injected into the active layer 13 from the first electrode 31 and increases the current injection efficiency.

The insulating film 17 is continuously formed, for example, on the upper surface (surface 10S1) and the side surfaces (surfaces 10S3) of each of the semiconductor stacked bodies 10 and the front surface (surface 11S1) of the first contact layer 11. The insulating film 17 includes, for example, a single layer film such as silicon nitride (SiN) or silicon oxide ($SiO_2$) or a stacked film. The insulating film 17 is provided with openings 17H (see, for example, FIG. 2E) at predetermined positions on the upper surfaces (surfaces 10S1) of the respective semiconductor stacked bodies 10 and the first contact layer 11. Each of the openings 17H is filled with the first electrode 31 or the second electrode 32.

The semi-insulating substrate 21 is a support substrate on which the plurality of semiconductor stacked bodies 10 is integrated. The semi-insulating substrate 21 is a substrate different from the substrate (e.g., crystal growth substrate 41) on which each of the semiconductor stacked bodies 10 described above is formed. The semi-insulating substrate 21 includes, for example, a GaAs-based semiconductor including, for example, no impurities. In addition, the semi-insulating substrate 21 is not necessarily limited to a typical semi-insulating substrate as long as the semi-insulating substrate 21 is low in carrier concentration and absorbs less laser light. For example, it is possible to use a substrate having a p-type or n-type carrier concentration of $5\times10^{17}$ $cm^{-3}$ or less as the semi-insulating substrate 21.

The first electrode 31 is provided on the first contact layer 11. For example, the first electrode 31 is formed by using, for example, a multilayered film of titanium (Ti)/platinum (Pt)/gold (Au).

The second electrode 32 is provided on the semiconductor stacked body 10. Specifically, the second electrode 32 is provided on the second contact layer 15. The second electrode 32 is formed by using, for example, a multilayered film of gold-germanium (Au—Ge)/nickel (Ni)/gold (Au).

The semiconductor laser 1 according to the present embodiment is a semiconductor laser having a so-called anode common structure in which the first electrode 31 and the plurality of semiconductor stacked bodies 10 are electrically coupled to each other by the first contact layer 11 including, for example, p-type GaAs.

In a case where predetermined voltages are applied to the first electrode 31 and the second electrode 32, voltages are applied from the first electrode 31 and the second electrode 32 to the semiconductor stacked body 10 in the semiconductor laser 1. This injects an electron from the first electrode 31 and injects a hole from the second electrode 32 in the light emitting region. The recombination of the electron and the hole generates light. Light is resonated and amplified between the first light reflecting layer 12 and the second light reflecting layer 14 and laser light L is emitted from the back surface (surface 21S2) of the semi-insulating substrate 21.

(1-2. Method of Manufacturing Semiconductor Laser)

Next, a method of manufacturing the semiconductor laser 1 is described with reference to FIGS. 2A to 2F.

First, as illustrated in FIG. 2A, the respective compound semiconductor layers included in the second contact layer 15, the second light reflecting layer 14, the active layer 13, the first light reflecting layer 12, and the first contact layer 11 are formed in this order on the crystal growth substrate 41 including, for example, n-type GaAs, for example, in an epitaxial crystal growth method such as an organometallic vapor growth (Metal Organic Chemical Vapor Deposition: MOCVD) method. In this case, for example, a methyl-based organic metal gas such as trimethylaluminum (TMAl), trimethylgallium (TMGa), or trimethylindium (TMIn) and an arsine ($AsH_3$) gas are used as raw materials of the compound semiconductor, disilane ($Si_2H_6$), for example, is used as a raw material of a donor impurity, and carbon tetrabromide ($CBr_4$), for example, is used as a raw material of an acceptor impurity.

Subsequently, as illustrated in FIG. 2B, the semi-insulating substrate 21 and the first contact layer 11 are joined. Solid-state welding is usable to join the semi-insulating substrate 21 and the first contact layer 11 by activating the front surface (surface 21S1) of the semi-insulating substrate 21 and the back surface (surface 11S2) of the first contact layer 11 and then bringing the semi-insulating substrate 21 and the first contact layer 11 into close contact, for example, under a high vacuum condition while applying a load.

Next, as illustrated in FIG. 2C, the crystal growth substrate 41 is removed, for example, by a polishing process and wet etching. Subsequently, a resist film (not illustrated) having a predetermined pattern is formed on the second light reflecting layer 14 and this resist film is then used as a mask to selectively etch the second light reflecting layer 14, the active layer 13, and the first light reflecting layer 12. In this case, it is preferable to use, for example, RIE (Reactive Ion Etching) with a Cl-based gas. This forms mesa structures (semiconductor stacked bodies 10) each having a columnar shape. After that, high-temperature treatment is performed under a water vapor atmosphere to form an oxidation layer (current confining layer 16) for current confinement. As illustrated in FIG. 2D, this forms the plurality of semiconductor stacked bodies 10 on the first contact layer 11. The plurality of semiconductor stacked bodies 10 is separated from each other.

Subsequently, as illustrated in FIG. 2E, the insulating film 17 is formed that has the openings 17H on the upper surfaces (surfaces 10S1) of the semiconductor stacked bodies 10 and the first contact layer 11. The insulating film 17 is formed, for example, in a chemical vapor growth (CVD: Chemical Vapor Deposition) method or an atomic layer deposition (ALD: Atomic Layer Deposition) method. After the insulating film 17 is formed to cover the whole of the front surface (surface 11S1) of the first contact layer 11 and the upper surfaces (surfaces 10S1) and the side surfaces (surfaces 10S3) of the semiconductor stacked bodies 10 formed on the first contact layer 11, a resist film (not illustrated) having a predetermined pattern is patterned on the insulating film 17 and etching such as RIE is performed to form the openings 17H.

Subsequently, as illustrated in FIG. 2F, the first electrode 31 and the second electrodes 32 are respectively patterned on the first contact layer 11 and the upper surfaces of the semiconductor stacked bodies 10 by using a lift-off method in which a resist pattern is, for example, used. This completes the semiconductor laser 1 illustrated in FIG. 1.

FIG. 3 schematically illustrates an example of a configuration of a light emitting apparatus in which the semiconductor laser 1 illustrated in FIG. 1 is mounted on a mounting substrate 51. The light emitting apparatus has a configuration in which the semiconductor laser 1 illustrated in FIG. 1 is, for example, flip-chip mounted on the mounting substrate 51. The flip-chip mounting is mounting the first electrode 31 and the second electrodes 32 of the semiconductor laser 1 to be opposed to the mounting substrate 51. The mounting substrate 51 includes, for example, a plurality of electrodes (not illustrated) on the front surface (surface 51S1). The plurality of electrodes is provided to have the respective patterns corresponding to the first electrode 31 and the second electrodes 32 of the semiconductor laser 1. The plurality of electrodes is electrically coupled, for example, by solder. The mounting substrate 51 may be provided with a drive circuit such as a power supply circuit for the semiconductor laser 1. In that case, a terminal of the drive circuit in itself may be configured to be coupled to the first electrode 31 and the second electrode 32 of the semiconductor laser 1.

(1-3. Workings and Effects)

The semiconductor laser 1 according to the present embodiment has the plurality of semiconductor stacked bodies 10 stacked above the semi-insulating substrate 21 with the first contact layer 11 interposed in between. The semiconductor laser 1 according to the present embodiment has, for example, a non-continuous lattice plane between the semi-insulating substrate 21 and the first contact layer 11. This is because the semiconductor stacked body 10 including the first contact layer 11 is grown on a substrate (crystal growth substrate 41) different from the semi-insulating substrate 21 and the first contact layer 11 formed on the semiconductor stacked body 10 and the semi-insulating substrate 21 are then joined. This allows the substrate to absorb less laser light L. In addition, it is possible to form the semiconductor stacked body 10 having a lower crystal defect density. The following describes this.

FIGS. 4 and 5 schematically illustrate examples of cross-sectional configurations of typical semiconductor lasers 1000A and 1000B. In a typical back-emitting surface emitting laser, for example, as with the semiconductor laser 1000A illustrated in FIG. 4, an n-DBR layer 1012, an active layer 1013, a current confining layer 1014, and a p-DBR layer 1015 are collectively formed, for example, on an n-type semiconductor substrate (n-GaAs substrate 1011) in an epitaxial crystal growth method. In the semiconductor laser 1000A fabricated in this way, the laser light L emitted from the back surface is absorbed by the n-GaAs substrate 1011, raising an issue about lowered oscillation characteristics.

Meanwhile, in a case where, for example, an n-GaAs contact layer 1026, an n-DBR layer 1022, an active layer 1023, a current confining layer 1024, and a p-DBR layer 1025 are collectively formed directly on a semiconductor stacked body 1021 as a device layer in an epitaxial crystal growth method, for example, as in the semiconductor laser 1000B illustrated in FIG. 5, the semiconductor stacked body 1021 has a high crystal defect density. This causes a considerable reduction in the reliability of the semiconductor laser in an energization operation.

In contrast, in the present embodiment, the second light reflecting layer 14, the active layer 13, the first light reflecting layer 12, and the first contact layer 11 are grown on a substrate (crystal growth substrate 41) different from the semi-insulating substrate 21 in this order and the first contact layer 11 is then joined to the semi-insulating substrate 21. The semiconductor laser 1 according to the present embodiment formed by using the method described above has a non-continuous lattice plane at the interface between the semi-insulating substrate 21 and the first contact layer 11. This makes it possible to form the semiconductor stacked body 10 having a lower crystal defect density. In addition, light emitted in the light emitting region is not absorbed by the substrate, but emitted from the back surface (surface 21S2) of the semi-insulating substrate 21.

As described above, in the semiconductor laser 1 according to the present embodiment, the semiconductor stacked body 10 is epitaxially grown on a substrate (crystal growth substrate 41) different from the semi-insulating substrate 21 and the first contact layer 11 formed along with the semiconductor stacked body 10 and the semi-insulating substrate 21 are then joined. This forms the semiconductor stacked body 10 having a low crystal defect density. This makes it possible to increase the reliability. In addition, the laser light L emitted in the light emitting region is not absorbed by the substrate, but it is possible to emit the laser light L from the back surface (surface 21S2) of the semi-insulating substrate 21. This achieves favorable laser oscillation characteristics.

The following describes modification examples (modification examples 1 to 5) and an application example of the present disclosure. The following assigns the same signs to components similar to those of the embodiment described above and omits descriptions thereof as appropriate.

2. Modification Examples 2-1. Modification Example 1

FIGS. 6A to 6G are cross-sectional schematic diagrams each describing a method of manufacturing a light emitting device (semiconductor laser 1A) according to a modification example 1 of the present disclosure. It is also possible to manufacture the semiconductor laser 1 described above, for example, as follows.

First, as illustrated in FIG. 6A, the second light reflecting layer 14, the active layer 13, the first light reflecting layer 12, and a first contact layer 11A are formed in this order on a crystal growth substrate 41 including, for example, n-type GaAs, for example, in an epitaxial crystal growth method such as a MOCVD method as in the embodiment described above.

Subsequently, as illustrated in FIG. 6B, a resist film (not illustrated) having a predetermined pattern is formed on the first contact layer 11A and this resist film is then used as a mask to selectively etch the first contact layer 11A, the first light reflecting layer 12, the active layer 13, and the second light reflecting layer 14 by using, for example, RIE. This forms mesa structures (semiconductor stacked bodies 10) each having a columnar shape and including the first contact layer 11A. After that, high-temperature treatment is performed under a water vapor atmosphere to form the current confining layer 16. This forms the plurality of semiconductor stacked bodies 10 on the crystal growth substrate 41. The plurality of semiconductor stacked bodies 10 is separated from each other.

Subsequently, as illustrated in FIG. 6C, a filler 53 is buried between the respective semiconductor stacked bodies 10 and a planar junction surface is formed along with the first contact layer 11A. In addition, as illustrated in FIG. 6D, a first contact layer 11B is grown in advance on the semi-insulating substrate 21.

Next, as illustrated in FIG. 6E, the first contact layer 11B on the semi-insulating substrate 21 and the first contact layer 11A formed above the crystal growth substrate 41 are joined. As in the embodiment described above, solid-state welding is usable to join the first contact layer 11A and the first contact layer 11B, for example, by activating the front surfaces of the first contact layer 11A and the first contact layer 11B and bringing the first contact layer 11A and the first contact layer 11B into close contact under a high vacuum condition while applying a load.

Subsequently, as illustrated in FIG. 6F, the crystal growth substrate 41 is removed, for example, by a polishing process and wet etching and the filler 53 is peeled off. Next, as illustrated in FIG. 6G, the insulating film 17 is formed that has openings on the upper surfaces (surfaces 10S1) of the semiconductor stacked bodies 10 and the first contact layer 11 and the first electrode 31 and the second electrodes 32 are formed in the openings as in the embodiment described above. This completes the semiconductor laser 1A. The semiconductor laser 1A fabricated in this way has a level difference between the region of the first contact layer 11 on which the semiconductor stacked body 10 is stacked and the other regions.

2-2. Modification Example 2

FIGS. 7A to 7D are cross-sectional schematic diagrams each describing a method of manufacturing a light emitting device (semiconductor laser 2) according to a modification example 2 of the present disclosure. It is also possible to manufacture the semiconductor device according to the present technology as follows.

First, as illustrated in FIG. 7A, a junction substrate is formed by bonding the crystal growth substrate 41 including n-type GaAs onto the semi-insulating substrate 21. Subsequently, as illustrated in FIG. 7B, the second light reflecting layer 14, the active layer 13, the first light reflecting layer 12, and the first contact layer 11 are formed in this order on the crystal growth substrate 41, for example, in an epitaxial crystal growth method such as a MOCVD method.

Next, as illustrated in FIG. 7C, a resist film (not illustrated) having a predetermined pattern is formed on the first contact layer 11A and this resist film is then used as a mask to selectively etch the first contact layer 11A, the first light reflecting layer 12, the active layer 13, and the second light reflecting layer 14 by using, for example, RIE. This forms mesa structures (semiconductor stacked bodies 10) each having a columnar shape and having the first contact layer 11 in the upper portion thereof. After that, high-temperature treatment is performed under a water vapor atmosphere to form the current confining layer 16. This forms the plurality of semiconductor stacked bodies 10 on the crystal growth substrate 41. The plurality of semiconductor stacked bodies 10 is separated from each other.

Subsequently, as illustrated in FIG. 7D, the insulating film 17 is formed that has openings on the upper surfaces of the semiconductor stacked bodies 10 or on the first contact layers 11 and the crystal-growth substrate 41 in specific terms and the first electrodes 31 and the second electrode 32 are formed in these openings as in the embodiment described above. This completes the semiconductor laser 2.

It is to be noted that the second light reflecting layer 14 corresponds to the "first light reflecting layer" according to the present disclosure and the first light reflecting layer 12 corresponds to the "second light reflecting layer" according to the present disclosure in the semiconductor laser 2 according to the present modification example. In addition, the crystal growth substrate 41 bonded onto the semi-insulating substrate 21 corresponds to the "first semiconductor layer" according to the present disclosure. In the semiconductor laser 2 according to the present modification example, a non-continuous lattice plane is formed between the semi-insulating substrate 21 and the crystal growth substrate 41.

In addition, in the present modification example, the example has been described in which a substrate including n-type GaAs is used as the crystal growth substrate 41, but the crystal growth substrate 41 may also be a p-type GaAs substrate. Alternatively, the crystal growth substrate 41 may also be a III-V group compound semiconductor substrate such as an InP substrate, an AlGaAs substrate, or an AlGaInP substrate.

2-3. Modification Example 3

FIGS. 8A to 8C are cross-sectional schematic diagrams each describing a method of manufacturing a light emitting device (semiconductor laser 3) according to a modification example 3 of the present disclosure. It is also possible to manufacture the semiconductor device according to the present technology as follows.

First, as illustrated in FIG. 8A, a junction substrate is formed by bonding the crystal growth substrate 41 including n-type GaAs onto the semi-insulating substrate 21 as in the modification example 2 described above. Subsequently, as illustrated in FIG. 8B, the first contact layer 11, the first light reflecting layer 12, the active layer 13, and the second light reflecting layer 14 are formed in this order on the crystal growth substrate 41, for example, in an epitaxial crystal growth method such as a MOCVD method.

After that, as illustrated in FIG. 8C, the second light reflecting layer 14, the active layer 13, and the first light reflecting layer 12 are selectively etched to form mesa structures (semiconductor stacked bodies 10) each having a columnar shape and the current confining layers 16, the insulating film 17, and the first electrode 31 and the second electrodes 32 are sequentially formed as in the embodiment described above. This completes the semiconductor laser 3.

In a case where the crystal growth substrate 41 including n-type GaAs is bonded onto the semi-insulating substrate 21 in this way, sequential epitaxial growth is also possible from the p-type first contact layer 11 side including, for example, $Al_{x1}Ga_{1-x1}As$ (0≤x1<1). In that case, the crystal growth substrate 41 including n-type GaAs is provided between the first contact layer 11 and the semi-insulating substrate 21. A non-continuous lattice plane is formed between the semi-insulating substrate 21 and the crystal growth substrate 41.

It is to be noted that the first contact layer 11 corresponds to the "first semiconductor layer" according to the present disclosure and the crystal growth substrate 41 corresponds to the "second semiconductor layer" according to the present disclosure in the semiconductor laser 3 according to the present modification example.

2-4. Modification Example 4

FIG. 9 schematically illustrates an example (semiconductor laser 4A) of a cross-sectional configuration of a light emitting device according to a modification example 4 of the present disclosure. FIG. 10 schematically illustrates another example (semiconductor laser 4B) of the cross-sectional configuration of the light emitting device according to the modification example 4 of the present disclosure.

In the modification example 2 and the modification example 3 described above, the examples have been described in which the crystal growth substrate 41 including n-type GaAs is directly bonded to the semi-insulating substrate 21, but there may be provided a dielectric layer 22 between the semi-insulating substrate 21 and the crystal growth substrate 41, for example, as illustrated in FIG. 9. The dielectric layer 22 includes, for example, silicon oxide ($SiO_2$), silicon nitride (SiN), aluminum oxide ($Al_2O_3$), or the like. Especially in a case where a material that is not lattice-matched with a GaAs substrate such as a III-V group compound semiconductor substrate including an InP substrate, an AlGaAs substrate, an AlGaInP substrate, or the like or a material having a thermal expansion coefficient different from that of the GaAs substrate is used as the crystal growth substrate 41, providing the dielectric layer 22 between the semi-insulating substrate 21 and the crystal growth substrate 41 makes it possible to increase the junction strength between the semi-insulating substrate 21 and the crystal growth substrate 41. This makes it stronger against thermal stress and makes it possible to increase the manufacturing yield.

Alternatively, as illustrated in FIG. 10, there may be provided a transparent electrically conductive layer 23 including, for example, ITO or the like between the semi-insulating substrate 21 and the crystal growth substrate 41. In a case where the transparent electrically conductive layer 23 is provided between the semi-insulating substrate 21 and the crystal growth substrate 41, there is provided an opening in the crystal growth substrate 41 along with the insulating film 17 to couple the second electrode 32 and the transparent electrically conductive layer 23. This causes the semiconductor laser 4B to have a so-called cathode common structure in which the second electrode 32 and the plurality of semiconductor stacked bodies 10 are electrically coupled to each other by the transparent electrically conductive layer 23. In this way, the semiconductor laser 4B allows the respective semiconductor stacked bodies 10 to be energized through the transparent electrically conductive layer 23. This makes it possible to reduce the wiring resistance between the second electrode 32 and the semiconductor stacked bodies 10, for example, as compared with a case of energization through an n-type semiconductor layer. It is possible to achieve light emission characteristics that are uniform between the semiconductor stacked bodies 10.

2-5. Modification Example 5

FIG. 11 schematically illustrates an example (semiconductor laser 5A) of a cross-sectional configuration of a light emitting device according to a modification example 5 of the present disclosure. FIG. 12 schematically illustrates another example (semiconductor laser 5B) of the cross-sectional configuration of the light emitting device according to the modification example 5 of the present disclosure. FIG. 13 schematically illustrates another example (semiconductor laser 5C) of the cross-sectional configuration of the light emitting device according to the modification example 5 of the present disclosure.

In the modification example 2 and the modification example 3 described above, the examples have been described in which the crystal growth substrate 41 including n-type GaAs is bonded to semi-insulating substrate 21, but a light reflecting layer 24 may be grown on the semi-insulating substrate 21 by epitaxial growth and this light reflecting layer 24 and the crystal growth substrate 41 may be bonded together, for example, as illustrated in FIG. 11. The light reflecting layer 24 has a stacked structure in which low refractive index layers and high refractive index layers are alternately superimposed. The light reflecting layer 24 includes, for example, n-type or p-type or non-doped AlGaAs.

Further, the dielectric layer 22 may be provided between the light reflecting layer 24 and the crystal growth substrate 41, for example, as illustrated in FIG. 12 as in the modification example 4 described above or the transparent electrically conductive layer 23 may be provided, for example, as illustrated in FIG. 13.

Providing the light reflecting layer 24 on the semi-insulating substrate 21 in this way makes it possible to omit the light reflecting layers (the second light reflecting layers 14 in the present modification example) of the semiconductor stacked bodies 10 on the semi-insulating substrate 21 side, for example, as with a semiconductor laser 5D illustrated in FIG. 14. This simplifies the epitaxially grown structure included in each of the semiconductor stacked bodies 10 and less growth conditions are thus adjusted, making it possible to form the high-quality active layer 13. It is therefore possible to achieve more favorable laser oscillation characteristics and high reliability.

3. Application Example

The present technology is applicable to a variety of electronic apparatuses including a semiconductor laser. For example, the present technology is applicable to a light source included in a portable electronic apparatus such as a smartphone, a light source of each of a variety of sensing apparatuses that each sense a shape, an operation, and the like, or the like.

FIG. 15 is a block diagram illustrating a schematic configuration of a distance measurement system (distance measurement system 200) in which a light emitting apparatus in which the semiconductor laser 1 described above is used is used, for example, as a lighting apparatus 100. The distance measurement system 200 measures distance in the ToF method. The distance measurement system 200 includes, for example, the lighting apparatus 100, a light receiving unit 210, a control unit 220, and a distance measurement unit 230.

The lighting apparatus 100 includes, for example, the semiconductor laser 1 illustrated in FIG. 1 or the like as a light source. The lighting apparatus 100 generates illumination light, for example, in synchronization with a light emission control signal CLKp of a rectangular wave. In addition, the light emission control signal CLKp is not limited to the rectangular wave as long as it is a periodic signal. For example, the light emission control signal CLKp may be a sine wave.

The light receiving unit 210 receives the reflected light that is reflected from an irradiation target 300 and detects, whenever a period of a vertical synchronization signal VSYNC elapses, the amount of light received within the period. For example, a periodic signal of 60 hertz (Hz) is used as the vertical synchronization signal VSYNC. In addition, in the light receiving unit 210, a plurality of pixel circuits is disposed in a two-dimensional lattice shape. The light receiving unit 210 supplies the image data (frame) corresponding to the amount of light received in these pixel circuits to the distance measurement unit 230. It is to be noted that the frequency of the vertical synchronization signal VSYNC is not limited to 60 hertz (Hz), but may be 30 hertz (Hz) or 120 hertz (Hz).

The control unit 220 controls the lighting apparatus 100. The control unit 220 generates the light emission control signal CLKp and supplies the lighting apparatus 100 and the light receiving unit 210 with the light emission control signal CLKp. The frequency of the light emission control signal CLKp is, for example, 20 megahertz (MHz). It is to be noted that the frequency of the light emission control signal CLKp is not limited to 20 megahertz (MHz), but may be, for example, 5 megahertz (MHz).

The distance measurement unit 230 measures the distance to the irradiation target 300 in the ToF method on the basis of the image data. This distance measurement unit 230 measures the distance for each of the pixel circuits and generates a depth map that indicates the distance to the object for each of the pixels as a gradation value. This depth map is used, for example, for image processing of performing a blurring process to the degree corresponding to the distance, autofocus (AF) processing of determining the focused focal point of a focus lens in accordance with the distance, or the like.

Although the present disclosure has been described above with reference to the embodiment and the modification examples 1 to 5 and the application example, the present disclosure is not limited to the embodiment and the like described above. A variety of modifications are possible. For example, the layer configuration of the semiconductor laser 1 described in the embodiment described above is an example and another layer may be further included. In addition, the materials of each of the layers are also examples. Those described above are not limitative.

It is to be noted that the effects described herein are merely illustrative and non-limiting. In addition, other effects may be provided.

It is to be noted that the present technology may be configured as below. According to the present technology having the following configurations, it is possible to prevent a substrate from absorbing laser light and it is thus possible to achieve favorable oscillation characteristics. In addition, it is possible to form a semiconductor stacked body having a lower crystal defect density. This makes it possible to increase the reliability.

(1)
A light emitting device including:
a semi-insulating substrate having a first surface and a second surface that are opposed to each other;
a first semiconductor layer that is stacked on the first surface of the semi-insulating substrate and has a lattice plane non-continuous to the semi-insulating substrate, the first semiconductor layer having a first electrical conduction type; and
a semiconductor stacked body that is stacked above the first surface of the semi-insulating substrate with the first semiconductor layer interposed in between, the semiconductor stacked body having a light emitting region configured to emit laser light.

(2)
The light emitting device according to (1), further including a second semiconductor layer between the semi-insulating substrate and the first semiconductor layer, the second semiconductor layer having a second electrical conduction type different from the first electrical conduction type.

(3)
The light emitting device according to (1) or (2), further including a dielectric layer between the semi-insulating substrate and the first semiconductor layer.

(4)
The light emitting device according to (1) or (2), further including an electrically conductive layer between the semi-insulating substrate and the first semiconductor layer, the electrically conductive layer having light transmissivity.

(5)
The light emitting device according to any one of (2) to (4), in which the first semiconductor layer or the second semiconductor layer includes a crystal growth substrate on which the semiconductor stacked body is epitaxially grown.

(6)
The light emitting device according to any one of (1) to (5), in which the first semiconductor layer has a level difference between a stack region of the semiconductor stacked body and another region.

(7)
The light emitting device according to any one of (1) to (6), in which the semi-insulating substrate includes a substrate having a p-type or n-type carrier concentration of $5 \times 10^{17}$ cm$^{-3}$ or less.

(8)
The light emitting device according to any one of (1) to (7), in which the semiconductor stacked body has a first light reflecting layer, an active layer, and a second light reflecting layer stacked in order from the semi-insulating substrate side.

(9)
The light emitting device according to (8), in which the semiconductor stacked body further includes a current confining layer between the first light reflecting layer and the active layer, the current confining layer having a current injection region.

(10)
The light emitting device according to (8), in which the semiconductor stacked body further includes a current confining layer between the active layer and the second light reflecting layer, the current confining layer having a current injection region.

(11)

The light emitting device according to any one of (1) to (10), further including:
- a first electrode that is provided on a surface of the semiconductor stacked body opposite to the semi-insulating substrate, the first electrode being provided to be configured to apply a predetermined voltage to the semiconductor stacked body in the light emitting region; and
- a second electrode that is provided on the first semiconductor layer.

(12)

The light emitting device according to any one of (1) to (11), in which the laser light is emitted from the second surface of the semi-insulating substrate.

(13)

A method of manufacturing a light emitting device, the method including
- bonding a semi-insulating substrate and a semiconductor stacked body with a first semiconductor layer interposed in between, the semi-insulating substrate having a first surface and a second surface that are opposed to each other, the semiconductor stacked body having a light emitting region configured to emit laser light, the first semiconductor layer having a first electrical conduction type.

(14)

The method of manufacturing the light emitting device according to (13), including joining the first surface of the semi-insulating substrate and another surface of the first semiconductor layer opposite to a surface on which the semiconductor stacked body is located.

(15)

The method of manufacturing the light emitting device according to (14), including joining the first surface of the semi-insulating substrate and the other surface of the first semiconductor layer after growing a second light reflecting layer, an active layer, and a first light reflecting layer and the first semiconductor layer in this order on a semiconductor substrate having the first electrical conduction type or a second electrical conduction type different from the first electrical conduction type.

(16)

The method of manufacturing the light emitting device according to (15), including separating the first light reflecting layer, the active layer, and the second light reflecting layer to form a plurality of the semiconductor stacked bodies after joining the first surface of the semi-insulating substrate and the other surface of the first semiconductor layer.

(17)

The method of manufacturing the light emitting device according to (15), including:
- growing a second light reflecting layer, an active layer, and a first light reflecting layer and a portion of the first semiconductor layer in this order on a semiconductor substrate having the first electrical conduction type or a second electrical conduction type different from the first electrical conduction type;
- separating the portion of the first semiconductor layer, the first light reflecting layer, the active layer, and the second light reflecting layer to form a plurality of the semiconductor stacked bodies;
- forming the portion of the first semiconductor layer on the first surface of the semi-insulating substrate; and
- joining the portion of the first semiconductor layer on the semi-insulating substrate side and the portion of the first semiconductor layer on the semiconductor stacked body side.

(18)

The method of manufacturing the light emitting device according to any one of (13) to (17), including growing and forming, after joining a semiconductor substrate to a first surface of a semi-insulating substrate as a crystal growth substrate, the first semiconductor layer and the semiconductor stacked body in order on the semiconductor substrate, the semi-insulating substrate having the first surface and a second surface that are opposed to each other, the semiconductor substrate having the first electrical conduction type or a second electrical conduction type different from the first electrical conduction type.

(19)

The method of manufacturing the light emitting device according to (18), including bonding, after forming a dielectric layer on the first surface of the semi-insulating substrate, the semiconductor substrate to the dielectric layer.

(20)

The method of manufacturing the light emitting device according to (18), including bonding, after forming an electrically conductive film on the first surface of the semi-insulating substrate, the semiconductor substrate to the electrically conductive film, the electrically conductive film having light transmissivity.

The present application claims the priority on the basis of Japanese Patent Application No. 2019-230069 filed on Dec. 20, 2019 with Japan Patent Office, the entire contents of which are incorporated in the present application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light emitting device comprising:
   - a semi-insulating substrate having a first surface and a second surface that are opposed to each other;
   - a first semiconductor layer that is stacked on the first surface of the semi-insulating substrate and has a lattice plane non-continuous to the semi-insulating substrate, the first semiconductor layer having a first electrical conduction type; and
   - a semiconductor stacked body that is stacked above the first surface of the semi-insulating substrate with the first semiconductor layer interposed in between, the semiconductor stacked body having a light emitting region configured to emit laser light.

2. The light emitting device according to claim 1, further comprising a second semiconductor layer between the semi-insulating substrate and the first semiconductor layer, the second semiconductor layer having a second electrical conduction type different from the first electrical conduction type.

3. The light emitting device according to claim 1, further comprising a dielectric layer between the semi-insulating substrate and the first semiconductor layer.

4. The light emitting device according to claim 1, further comprising an electrically conductive layer between the semi-insulating substrate and the first semiconductor layer, the electrically conductive layer having light transmissivity.

5. The light emitting device according to claim 2, wherein the first semiconductor layer or the second semiconductor layer includes a crystal growth substrate on which the semiconductor stacked body is epitaxially grown.

6. The light emitting device according to claim 1, wherein the first semiconductor layer has a level difference between a stack region of the semiconductor stacked body and another region.

7. The light emitting device according to claim 1, wherein the semi-insulating substrate includes a substrate having a p-type or n-type carrier concentration of $5 \times 10^{17}$ cm$^{-3}$ or less.

8. The light emitting device according to claim 1, wherein the semiconductor stacked body has a first light reflecting layer, an active layer, and a second light reflecting layer stacked in order from the semi-insulating substrate side.

9. The light emitting device according to claim 8, wherein the semiconductor stacked body further includes a current confining layer between the first light reflecting layer and the active layer, the current confining layer having a current injection region.

10. The light emitting device according to claim 8, wherein the semiconductor stacked body further includes a current confining layer between the active layer and the second light reflecting layer, the current confining layer having a current injection region.

11. The light emitting device according to claim 1, further comprising:
    a first electrode that is provided on a surface of the semiconductor stacked body opposite to the semi-insulating substrate, the first electrode being provided to be configured to apply a predetermined voltage to the semiconductor stacked body in the light emitting region; and
    a second electrode that is provided on the first semiconductor layer.

12. The light emitting device according to claim 1, wherein the laser light is emitted from the second surface of the semi-insulating substrate.

13. A method of manufacturing a light emitting device, the method comprising
    bonding a semi-insulating substrate and a semiconductor stacked body with a first semiconductor layer interposed in between, the semi-insulating substrate having a first surface and a second surface that are opposed to each other, the semiconductor stacked body having a light emitting region configured to emit laser light, the first semiconductor layer having a first electrical conduction type;
    joining the first surface of the semi-insulating substrate and another surface of the first semiconductor layer opposite to a surface on which the semiconductor stacked body is located; and
    joining the first surface of the semi-insulating substrate and the other surface of the first semiconductor layer after growing a second light reflecting layer, an active layer, and a first light reflecting layer and the first semiconductor layer in this order on a semiconductor substrate having the first electrical conduction type or a second electrical conduction type different from the first electrical conduction type.

14. The method of manufacturing the light emitting device according to claim 13, comprising separating the first light reflecting layer, the active layer, and the second light reflecting layer to form a plurality of the semiconductor stacked bodies after joining the first surface of the semi-insulating substrate and the other surface of the first semiconductor layer.

15. The method of manufacturing the light emitting device according to claim 13, comprising:
    growing a second light reflecting layer, an active layer, and a first light reflecting layer and a portion of the first semiconductor layer in this order on a semiconductor substrate having the first electrical conduction type or a second electrical conduction type different from the first electrical conduction type;
    separating the portion of the first semiconductor layer, the first light reflecting layer, the active layer, and the second light reflecting layer to form a plurality of the semiconductor stacked bodies;
    forming the portion of the first semiconductor layer on the first surface of the semi-insulating substrate; and
    joining the portion of the first semiconductor layer on the semi-insulating substrate side and the portion of the first semiconductor layer on the semiconductor stacked body side.

16. The method of manufacturing the light emitting device according to claim 13, comprising growing and forming, after joining a semiconductor substrate to a first surface of a semi-insulating substrate as a crystal growth substrate, the first semiconductor layer and the semiconductor stacked body in order on the semiconductor substrate, the semi-insulating substrate having the first surface and a second surface that are opposed to each other, the semiconductor substrate having the first electrical conduction type or a second electrical conduction type different from the first electrical conduction type.

17. The method of manufacturing the light emitting device according to claim 16, comprising bonding, after forming a dielectric layer on the first surface of the semi-insulating substrate, the semiconductor substrate to the dielectric layer.

18. The method of manufacturing the light emitting device according to claim 16, comprising bonding, after forming an electrically conductive film on the first surface of the semi-insulating substrate, the semiconductor substrate to the electrically conductive film, the electrically conductive film having light transmissivity.

* * * * *